United States Patent
Laakso et al.

(10) Patent No.: US 12,128,293 B1
(45) Date of Patent: Oct. 29, 2024

(54) ALPINE SKIS AND THE LIKE WITH HORIZONTALLY LAYERED WOODEN CORES

(71) Applicant: Drake Powderworks, LLC, Salt Lake City, UT (US)

(72) Inventors: Thomas Laakso, Park City, UT (US); James Eckels, Park City, UT (US); Nick Pascoe, Wanaka (NZ); Seth Payne, Salt Lake City, UT (US); Stephan Drake, Salt Lake City, UT (US); Peter Turner, Eden, UT (US); Kam K. Leang, Salt Lake City, UT (US)

(73) Assignee: Drake Holdings, Inc., Salt Lake City, UT (US)

( * ) Notice: Subject to any disclaimer, the term of this patent is extended or adjusted under 35 U.S.C. 154(b) by 185 days.

(21) Appl. No.: 17/076,422

(22) Filed: Oct. 21, 2020

Related U.S. Application Data

(60) Provisional application No. 62/924,123, filed on Oct. 21, 2019.

(51) Int. Cl.
*A63C 5/12* (2006.01)
*B32B 15/10* (2006.01)
(Continued)

(52) U.S. Cl.
CPC ............... *A63C 5/12* (2013.01); *B32B 15/10* (2013.01); *B32B 21/042* (2013.01); *B32B 21/10* (2013.01);
(Continued)

(58) Field of Classification Search
CPC .......... A63C 5/03; A63C 5/04; A63C 5/0405; A63C 5/0411; A63C 5/048; A63C 5/0485;
(Continued)

(56) References Cited

U.S. PATENT DOCUMENTS 5,320,378 A * 6/1994 Wiig ................. A63C 5/03
280/610
6,182,986 B1 2/2001 Smith
(Continued)

FOREIGN PATENT DOCUMENTS

FR 2810250 A1 * 12/2001 ............... A63C 5/04
FR 2881660 A1 * 8/2006 ............... A63C 5/07

OTHER PUBLICATIONS

Translation of FR2881660. (Year: 2006).*
(Continued)

*Primary Examiner* — Catherine A. Simone
(74) *Attorney, Agent, or Firm* — Stoel Rives LLP

(57) ABSTRACT

A ski, snowboard, or other gliding board for snow sports includes a horizontally-laminated core of at least first and second wooden layers overlying a low-friction base, and a layer of high-modulus non-wooden material, such as carbon fiber composite, overlying the core. The second wooden layer overlies at least a portion of the first wooden layer and preferably has a flexural modulus that is greater than a flexural modulus of the first layer. The wooden materials and dimensions of the first and second layers are selected to provide improved vibration damping. Manufacturing methods resulting in reduced waste and improved vibration damping performance are also disclosed.

32 Claims, 5 Drawing Sheets

(51) Int. Cl.
*B32B 21/04* (2006.01)
*B32B 21/10* (2006.01)

(52) U.S. Cl.
CPC ..... *B32B 2262/106* (2013.01); *B32B 2605/00* (2013.01)

(58) Field of Classification Search
CPC ........... A63C 5/052; A63C 5/12; A63C 5/124; A63C 5/126; B32B 15/10; B32B 21/042; B32B 21/10; B32B 2262/106; B32B 2605/00
See application file for complete search history.

(56) References Cited

U.S. PATENT DOCUMENTS

| | | | |
|---|---|---|---|
| 6,406,054 B1 | 6/2002 | Huyghe | |
| 6,481,741 B1* | 11/2002 | Porte | A63C 5/0405 |
| | | | 280/610 |
| 6,502,850 B1 | 1/2003 | Schaller et al. | |
| 7,735,844 B2 | 6/2010 | Gallo | |
| 8,104,784 B2 | 1/2012 | Sylvain | |
| 2003/0146599 A1* | 8/2003 | Stefanova | A63C 9/003 |
| | | | 280/609 |
| 2008/0106068 A1 | 5/2008 | Drake et al. | |
| 2011/0206895 A1 | 8/2011 | Turner et al. | |
| 2012/0181777 A1 | 7/2012 | Turner et al. | |
| 2014/0062064 A1 | 3/2014 | Kilchenstein et al. | |
| 2021/0339113 A1* | 11/2021 | Ekker | B32B 3/263 |

OTHER PUBLICATIONS

Translation of FR2810250A1. (Year: 2001).*
2011-2012 Ullr Custom Skis: "Early Taper" Resort Demo, http://www.exoticskis.com/forum/default.aspx?g=posts&m=403, Mar. 5, 2012.
The Clymb, Armada Eddllo Skis, retrieved Jun. 18, 2019 from [https://www.theclymb.com/Product.aspx?l=00180068011500000000&p=ADA01271].
Wood/Carbon Core Matrix, http://skibuilders.com/phpBB2/viewtopic.php?p=46047&sid=9da918cfcdb77674abdb4a618d03a98f, Mar. 10, 2015.

* cited by examiner

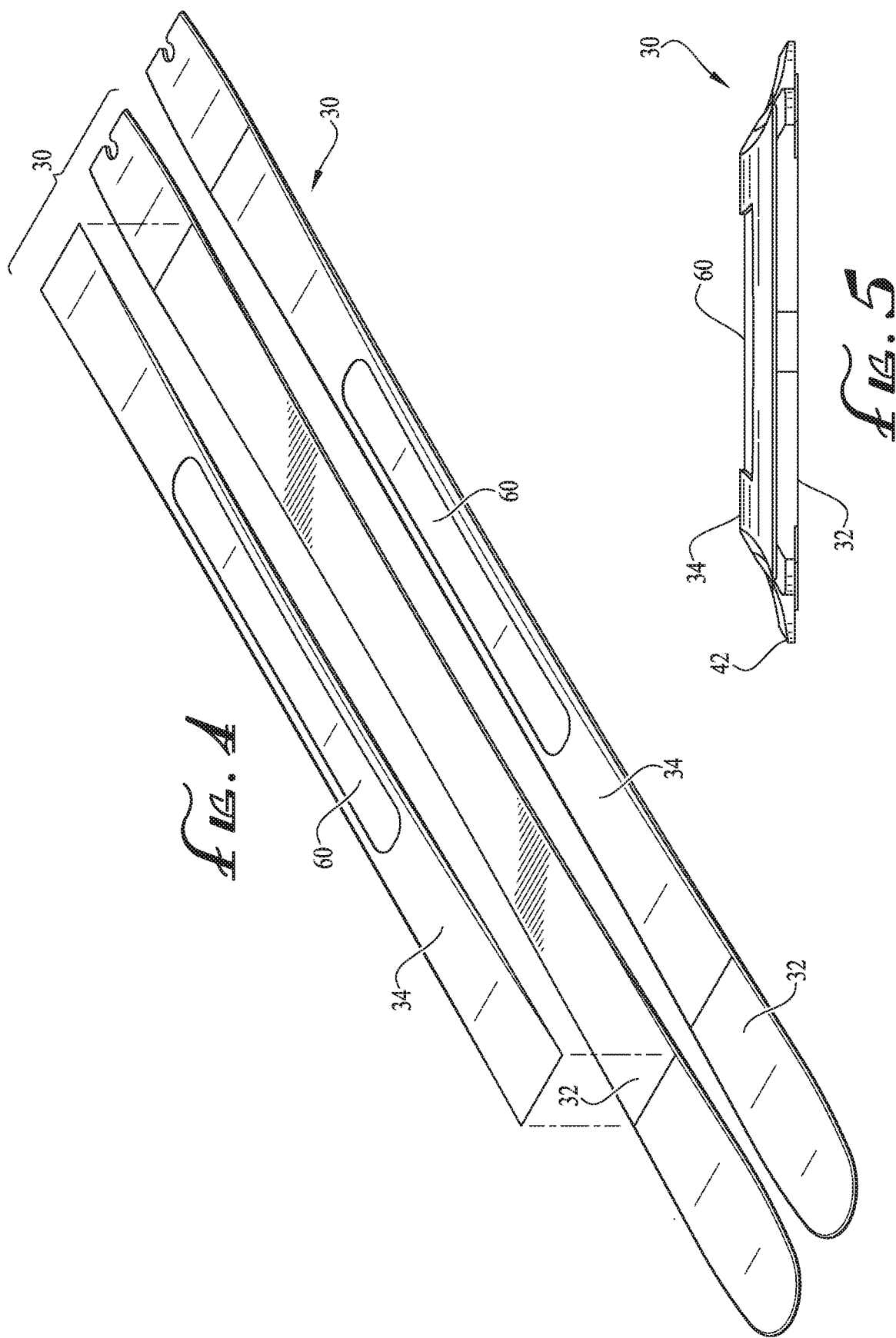

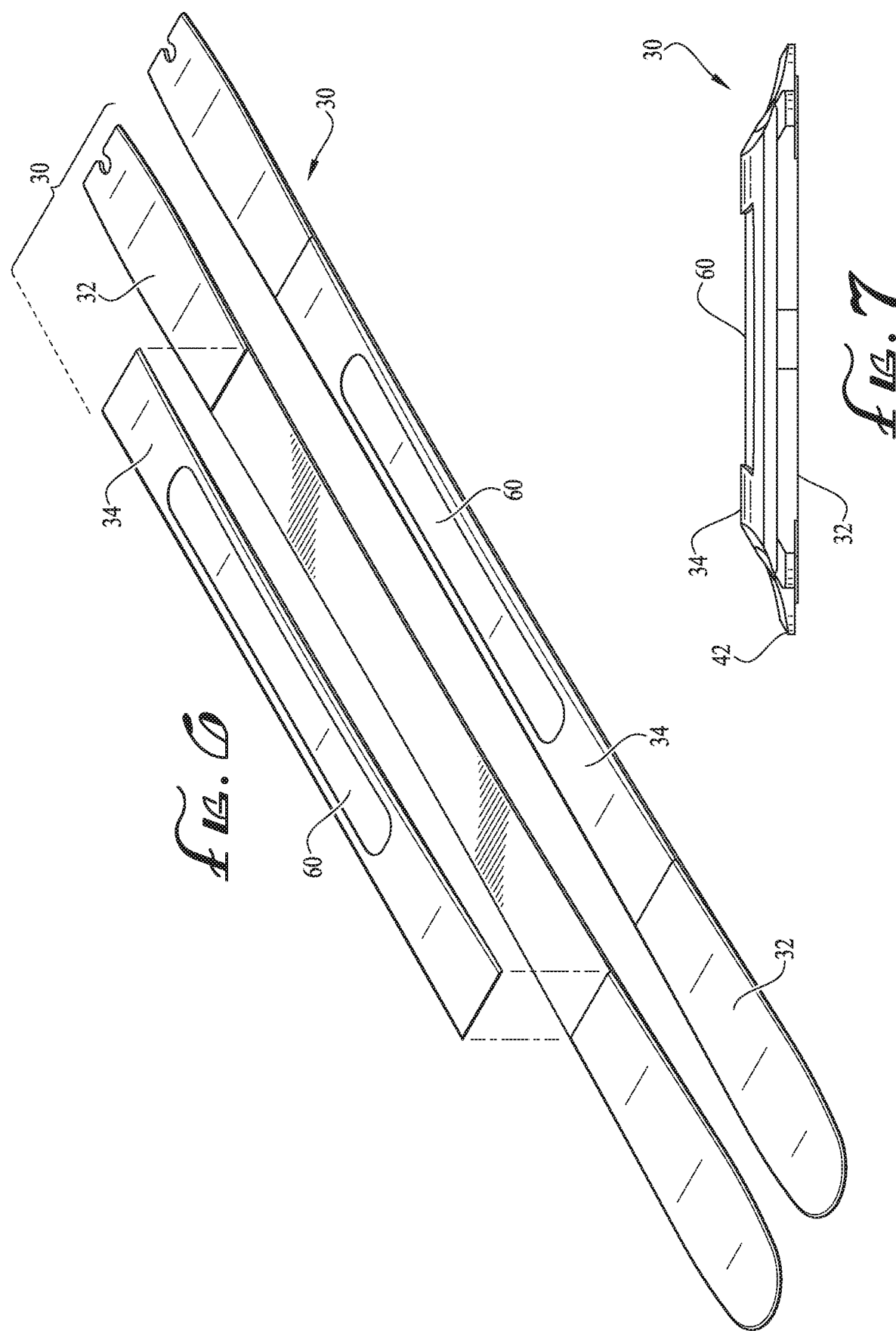

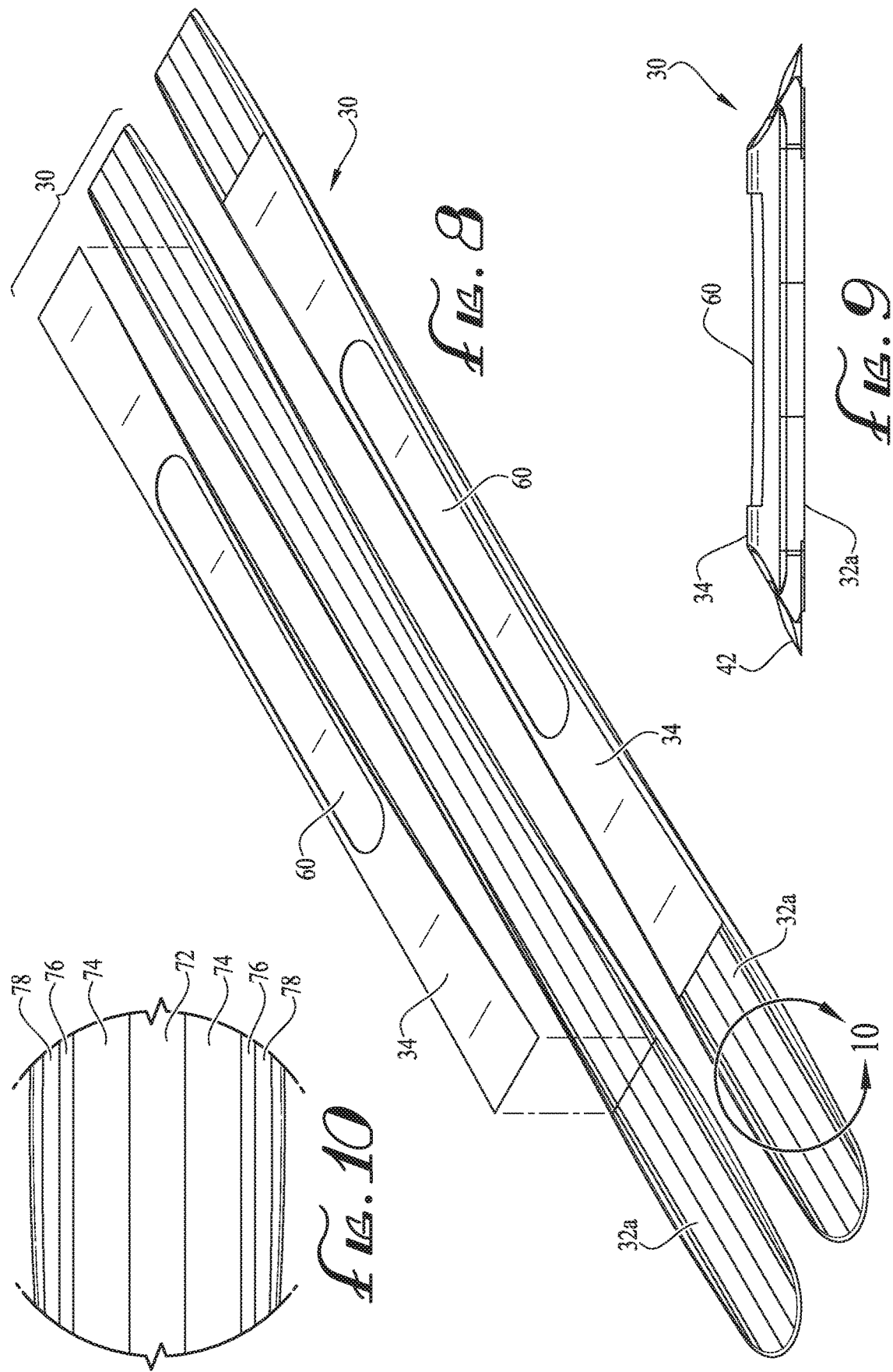

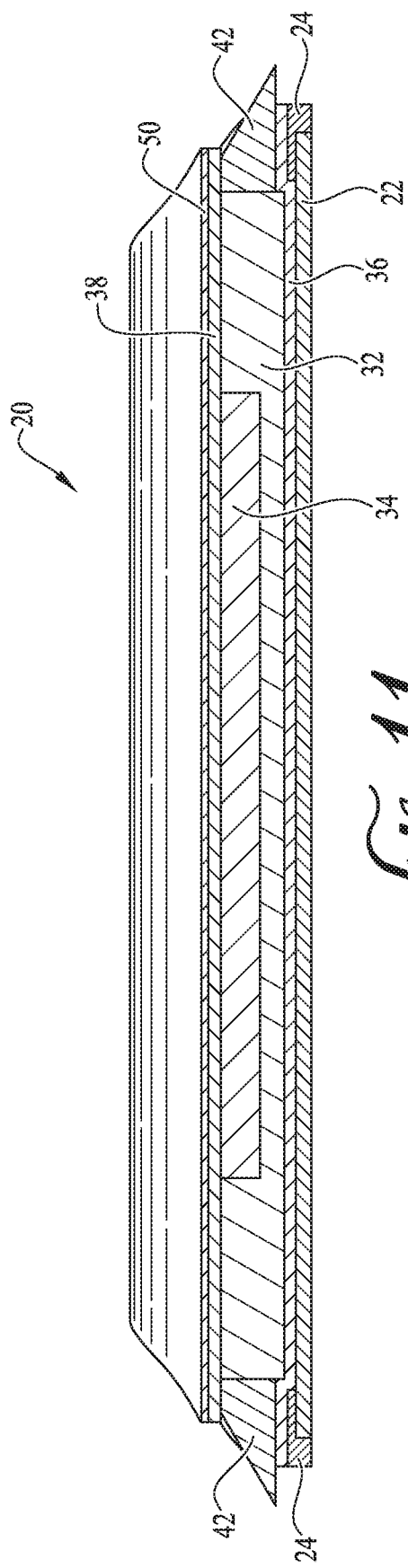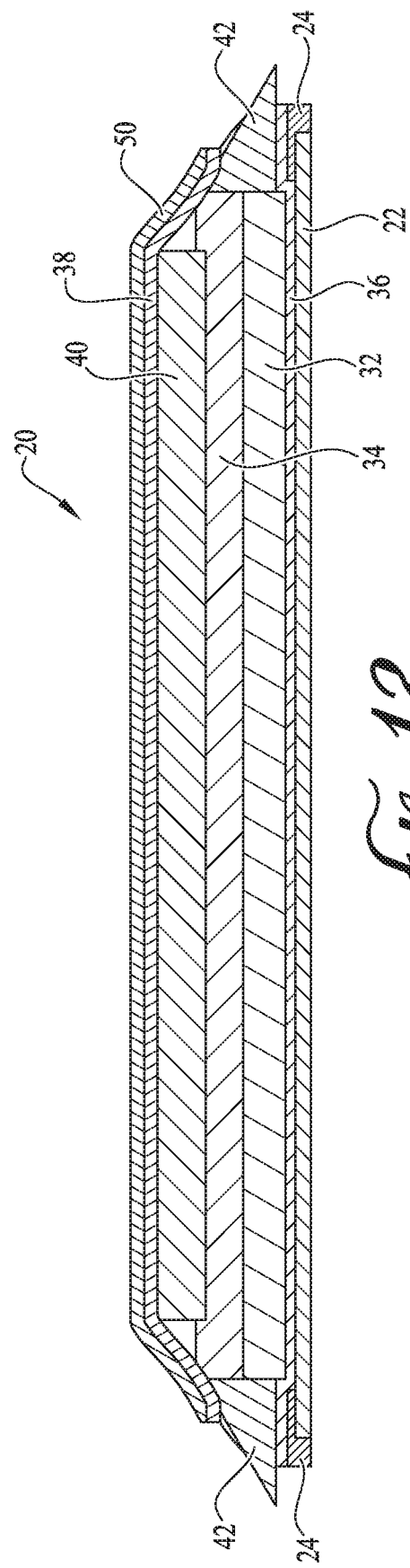

ALPINE SKIS AND THE LIKE WITH HORIZONTALLY LAYERED WOODEN CORES

RELATED APPLICATION

This application claims the benefit under 35 U.S.C. § 119(e) of U.S. Provisional Patent Application No. 62/924,123, filed Oct. 21, 2019, which is incorporated herein by reference.

TECHNICAL FIELD

The present disclosure relates to skis, snowboards, and other similar sporting goods used for riding or gliding on snow or other surfaces and, more particularly, to alpine skis and snowboards having a layered composite core structure.

BACKGROUND

Gliding boards such as alpine skis and snowboards are typically constructed of several layers and components, including a low-friction base layer, such as sintered polyethylene, bordered by metal edges; a core, conventionally made of wood or foam; reinforcing or stiffening layers, such as a metal layer; and a wear-resistant polymer topsheet.

A common wood core design in conventional skis comprises a set of thin strips of wood (typically 0.5 inch wide or less) running the length of the ski which are glued or adhesively bonded together in side-to-side relation along their vertical side surfaces, then profiled by CNC machining the core along its length to taper the thickness of the core so that it is thinner near the tip and tail of the ski. Such vertically-laminated cores, which are often comprised of segments of different species of wood, help reduce the effect of natural variations in the material properties of wood due to grain variations and other effects, and thereby provide for more consistent and predictable flex and torsion characteristics across the length and width of the finished ski. Vertical laminate wood core construction, however, is more expensive and time consuming to build than a solid wood or foam core. The applicant has also recognized that the step of profiling the core to achieve the desired tapered thickness along the length of the ski generates a substantial amount of waste in the form of sawdust, which has potentially significant environmental and occupational health impacts.

Patent Application Pub. No. US 2011/0206895, published Aug. 25, 2011, describes a carbon fiber laminate ski having a core made of wood and vertically oriented ribs of metal running lengthwise along at least part of the length of the ski, all sandwiched between upper and lower layers of carbon fiber composite made of woven carbon fiber fabric and resin.

Skis or snowboards made with carbon fiber composites as stiffening layers demonstrate numerous performance advantages over counterparts constructed with conventional fiberglass or metal laminates. The advantages are similar to other sporting goods utilizing carbon fiber-namely, high torsional stiffness, high reactivity, and increased strength at a reduced weight. When carbon fiber laminates are utilized, the skier enjoys less fatigue, more maneuverability as well as enhanced qualitative sensations of rebound and power. However, skis made with carbon fiber laminates have a fundamental weakness: poor vibration damping. Compared to skis made with fiberglass or metal laminates, skis with carbon fiber composite layers inherently transmit unpleasant vibrations to the user which can result in the loss of edge grip, control, and confidence at higher speeds.

The applicant has explored numerous methods of damping carbon fiber skis, such as the use of polymer damping materials employed above and below the laminates, the addition of damped material placed in vertical strips inside the ski core, and damping mechanisms affixed to various locations on the ski above the top sheet. None of these methods has been found to provide adequate reductions in vibration felt by the skier. The applicant has since discovered a core construction for a carbon fiber ski that provides improved vibration reduction.

SUMMARY

A ski, snowboard or other gliding board according to embodiments of the present disclosure includes a low-friction base layer, a wooden core comprised of a first horizontal strip of wooden material overlying the base, and a second horizontal strip of wooden material shorter than the first strip of wooden material. The second horizontal strip overlies the first horizontal strip and is adhered or otherwise bonded thereto. Overlying the wooden core is a non-wooden laminate layer, such as a resin-impregnated carbon fiber fabric composite or other high-modulus material. A topsheet may overlie the non-wooden laminate layer, and the entire stack of ski components may be pressed together at high temperature in a contoured die or press to cure resins and adhere together the different layers of base, core, non-wooden layer, and topsheet. In some embodiments, a second carbon fiber composite layer may overlie the base and be sandwiched between the base and the wood core. A binding retention plate that is shorter than the second horizontal strip may be inserted into a recess formed in the top surface of the second horizontal strip of the core in some embodiments.

Wood core layers are preferably chosen so that the wood species of the second (upper) horizontal strip of wood is different from and stiffer than the wood species of the first (lower) horizontal strip. In other embodiments, the upper and lower core layers may be formed of laminates including wood and optionally other materials, such as foam, or of other composite materials preferably including wood for its damping qualities. The first (lower) horizontal layer preferably extends substantially the entire length of the ski, while the second (upper) horizontal layer is preferably significantly shorter than the first layer (e.g. between 50% and 80% of the length of the first layer) and is positioned centrally of the length of the first layer so that the second layer is in the binding region of the ski and does not overlap the tip and tail end regions of the first layer. The second layer may be profiled or contoured to taper along its length so that it is thinnest at its tipward (forward) and tailward (rearward) ends. Alternatively, the first and second layers may each be of relatively uniform thickness along their length prior to being adhesively bonded together. After the first and second layers are bonded together, they are profiled via a CNC machining and/or sanding operation to result in a smoothly tapered thickness with a continuously smooth upper surface. Advantageously, because the second layer is shorter than the first layer, little of the second layer is removed by the machining and/or sanding operations during profiling, thereby reducing waste. After the core layers are bonded and profiled, a high-modulus laminate layer, such as a carbon fiber fabric composite material, is applied over the core. The high-modulus laminate layer preferably extends along the entire length and width of the ski. The entire multi-layer structure is then cured in a contoured press under heat and pressure to form lengthwise curvature such as tip shovel, camber, rocker and the like. Bonding of the carbon fiber composite (or other high-modulus material) directly to both the first and second horizontally-laminated layers of wooden core material is preferred and may provide improved damping performance.

Additional aspects and advantages will be apparent from the following detailed description of preferred embodiments, which proceeds with reference to the accompanying drawings.

BRIEF DESCRIPTION OF THE DRAWINGS

FIG. 4 is an exploded isometric view of a pair of two-component wood cores in accordance with a second embodiment, with one shown in an exploded view;

FIG. 5 is a lateral cross section view of the ski core of FIG. 4 shown with poured sidewalls forming a core subassembly;

FIG. 6 is an exploded perspective view of a two-component wood core in accordance with a third embodiment;

FIG. 7 is a lateral cross section view of the ski core of FIG. 6 shown with poured sidewalls forming a core subassembly;

FIG. 8 is an exploded perspective view of a two-component wood core in accordance with a fourth embodiment;

FIG. 9 is a lateral cross section view of the ski core of FIG. 8 shown with poured sidewalls forming a core subassembly;

FIG. 10 is an enlarged top detail view of area 10-10 in FIG. 8 showing detail of a vertically laminated lower core;

FIG. 11 is an enlarged lateral cross section view of the ski of FIG. 1 taken along line 11-11 in FIG. 3; and FIG. 12 is an enlarged lateral cross section view of the ski of FIG. 1 taken along line 12-12 in FIG. 3.

DETAILED DESCRIPTION OF PREFERRED EMBODIMENTS

The following description of embodiments is made in reference to alpine skis. However, it should be appreciated that the principles described in this disclosure may also be applied to alpine touring skis, snowboards, and other sporting goods equipment for sliding or gliding over snow, water, or other surfaces. The principles may also be applied to other items made with carbon fiber composite for which vibration dampening is important.

Figure 1:
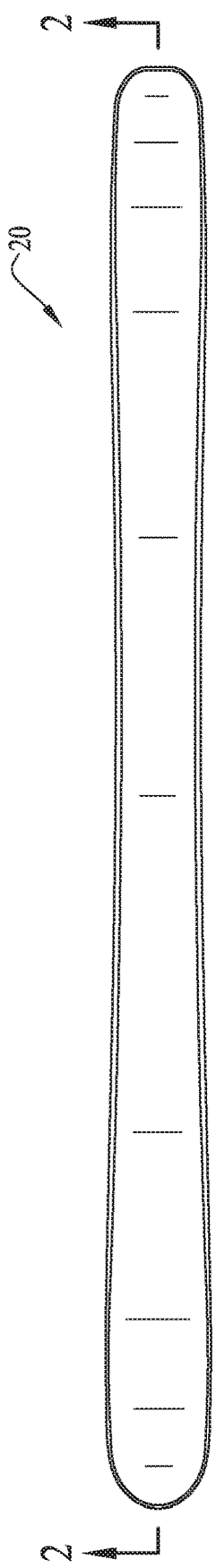
FIG. 1 is a top view of an alpine ski.
Figure 2:
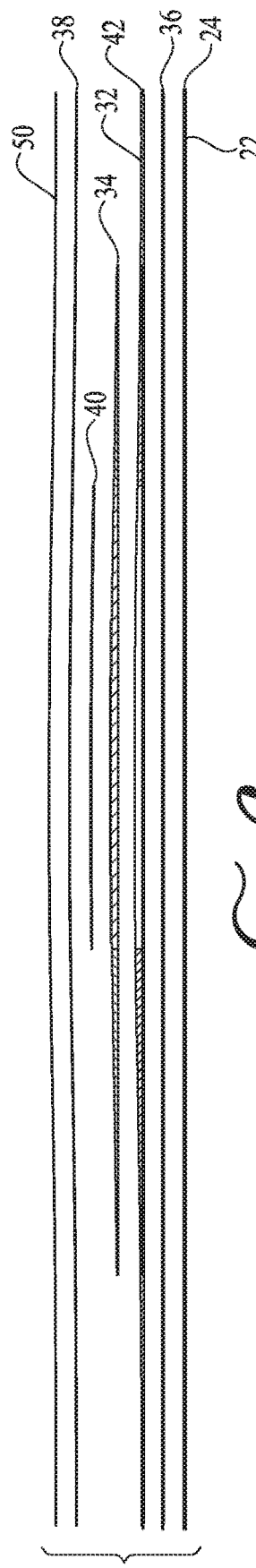
FIG. 2 is a longitudinal exploded cross-sectional view of the ski of FIG. 1, taken along line 2-2 in FIG. 1.

FIG. 1 is a top view of a ski 20 according to a preferred embodiment. FIG. 2 is an exploded side elevation view of the components comprising the ski 20 of FIG. 1, which are illustrated without final tip curvature and camber formed during a final pressing of the assembled components. With reference to FIG. 2, the ski 20 includes a base 22 made of a low-friction material, such as sintered polyethylene known by the trademark P-TEX, flanked by metal edges 24 in a typical arrangement. A core 30 (FIGS. 4-9) comprised of a lower core 32 and an upper core 34 is sandwiched between a lower laminate layer 36 and an upper laminate layer 38 and overlies the base 22 and edges 24. A binding reinforcement plate 40 overlies the upper core 34 and underlies the upper laminate layer 38. Sidewalls 42 flank the left and right sides of the core and may also flank the tail and/or tip of the core. A topsheet 50 overlies the upper laminate layer 38. The entire assembly of base 22, core 30 (including lower and upper cores 32,34), binding reinforcement plate 40, sidewalls 42, and laminate layers 36, 38 is laminated together and bonded via adhesives and resins, as will be further described below.

The lower and upper laminate layers 36, 38 are preferably made of a carbon fiber composite material, such as a resin-impregnated carbon fiber fabric. One such fabric is a triaxial woven fabric formed of approximately 80% carbon fiber and 20% fiberglass, and pre-impregnated with resin. Other types of reinforcing fabrics may be utilized comprising greater or lesser proportions of carbon fiber, such as greater than 50% by weight carbon fiber, with the balance including fiberglass and/or other fibers or materials. In other embodiments, the laminate layers 36, 38 may be made of other isotropic or anisotropic high-strength materials, such as metal, fiberglass, or other high-modulus composite materials, such as aramid fiber composites (e.g. KEVLAR), and composites formed of resin-impregnated fabric made of fibers of poly(p-phenylene-2,6-benzobisoxazole) (also known as "PBO") available under the trademark ZYLON, or various combinations thereof, including woven combinations. In still other embodiments carbon-fiber tow may be utilized selectively, either alone or in combination with fiber composite fabrics, to achieve desired properties.

The protective sidewalls 42 may be formed of a resin material that is poured around the sides of the assembled core and cured prior to layup of the high-strength laminate layers 36, 38.

Figure 3:
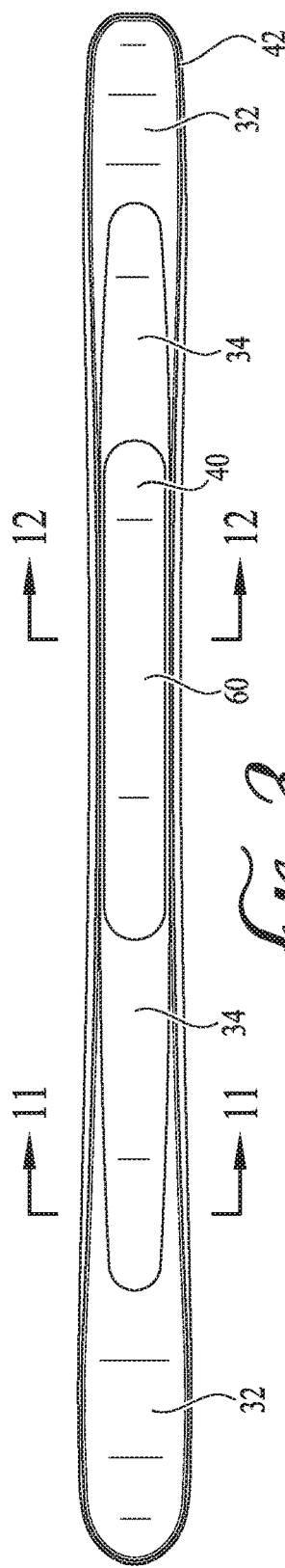
FIG. 3 is a top view of the ski of FIG. 1 with a topsheet and upper carbon-fiber laminate layer hidden to reveal details of a horizontal laminate core of the ski.

FIG. 3 illustrates the ski of FIGS. 1 and 2 with the topsheet 50 and upper laminate layer 38 omitted (hidden) to show detail of the core. With reference to FIGS. 2 and 3, the lower core 32 preferably is a solid plank of wood that is cut to the approximate shape of the ski and tapered along its length so that it is thinner near the tip and tail ends thereof. The thickness profile may be cut or machined by a CNC milling machine or other computerized equipment. Lower cores 32 for a matched pair of skis are preferably cut from a single piece of wood to ensure that both the left and right skis have similar flex characteristics. Lower core 32 may preferably be made from a relatively soft wood species, such as poplar, *paulownia*, balsa, and aspen. In some embodiments, lower core 32 may be made of another kind of wooden material, such as a vertical laminate of wood strips glued in side-by-side relation prior to profiling, including combinations of one or more different soft woods (such as poplar, *paulownia*, balsa, and aspen), or foam, or combinations of one or more soft woods, foam, and even some hard woods. In some embodiments, lower core 32 may be made of bamboo, foam, or a combination of two or more of wood, foam and bamboo in a vertical laminate. In other embodiments, the lower core 32 may be made of a horizontal laminate of one or more soft woods, foam, and/or bamboo.

As used herein, the term "wooden material" is intended to encompass not only solid wood, but also bamboo and other wood-like materials, laminates of wood and/or wood-like materials, and laminates of wood and/or wood-like materials with other materials, such as foam or metal. Similarly, "wooden core" and "wooden layer" mean core or core layers that include any such wooden materials.

The upper core 34 is layered over the lower core 32 and extends forward and rearward of a region where a binding will be mounted to the ski, but only part way toward the tip and tail of the ski. The upper core 34 may also be profiled so that its thickness is tapered along its length to be thinner near the forward and rearward ends of the upper core 34. The upper core 34 is preferably made of a significantly harder and denser species of wood than lower core 32 such that it has greater bending strength (flexural modulus) than the wood of lower core 32. Suitable hard wood species for the upper core 34 include solid ash, maple, bamboo, poplar, and birch. In some embodiments, the upper core 34 may be made of a vertical laminate of strips of one or more hard wood species, or a combination of hard and soft wood strips (and/or bamboo), glued in side-by-side relation prior to profiling. In other embodiments, the upper core 34 may be made of another kind of wooden material, such as a horizontal laminate of one or more hard woods or other materials. In any event, the overall flexural modulus of the upper core 34 should preferably be higher than the overall flexural modulus of the lower core 32.

The upper core 34 is bonded to the lower core 32 using wood glue or another adhesive or bonding material. The upper core 34 may extend over approximately 50% to 80% of the length of the lower core 32 and may have a sidecut that tapers toward its forward and rearward ends, as illustrated in FIG. 3, so that the ends of the upper core 34 are narrower than the width of the lower core 32. The ends of the upper core 34 may also be radiused as illustrated in FIG. 3. After the assembly of lower core 32 and upper core 34 is bonded together it may be CNC machined or sanded to provide a continuously smooth profile along the length of the core 30, and a nearly seamless transition of the upper core 34 at its end to the lower core 32.

The bonding of the higher-modulus upper core 34 to the low-modulus lower core 32 is believed to achieve improved damping by shortening the effective chord lengths of the ski (each in different regions of the core 30), thereby inhibiting the transmission of vibrations and standing waves to the skier. The relative lengths and thicknesses of the horizontally-laminated core layers 32, 34, and their relative flex moduluses, are carefully selected to provide destructive interference that tends to damp vibration induced by terrain features and interaction between the ski and the snow surface.

In some embodiments (not illustrated), the core 30 may be made of more than two horizontally-laminated layers of wood, foam, and/or other materials. For example, a three-layer core may comprise three different species of wood, of different lengths, with the highest modulus species on top, nearest the upper laminate layer 38. In another embodiment more than three horizontally-laminated core layers may be utilized. The core layers may alternate in lengths and moduli to achieve desired damping performance. In each case, the bond between layers of the core 30 and between the core 30 and the lower and upper laminate layers 36, 38 (e.g., the carbon-fiber composite laminate or other high-modulus composite material) is desirably a close bond of a relatively strong wood glue, resin, or adhesive that tends to prevent the layers from slipping over each other.

The binding reinforcement plate 40 provides additional thickness for mounting bindings (not shown) to the ski using screws, and to help retain the screws. Suitable materials for binding reinforcement plates 40 include wood, metal, randomly-oriented fiberglass mats, and plastics such as ultra-high molecular weight polyethylene (UHMWPE) or acrylonitrile butadiene styrene (ABS), for example. The binding reinforcement plate 40 is preferably shorter than the upper core 34 and inset in a pocket 60 formed in the top surface of upper core 34. The binding reinforcement plate 40 may optionally be glued, adhered, or otherwise bonded or attached to upper core 34 before the core 30 and binding reinforcement plate 40 are laid up with the lower and upper laminate layers 36, 38. The binding reinforcement plate 40 may be thicker than the depth of the pocket 60 so that the binding reinforcement plate 40 rises above a top surface of the upper core 34.

Turning to FIGS. 4 and 5, another embodiment of a core assembly is illustrated in which an upper core 34 is the full width of the ski and tapers in thickness to very thin ends which are squared, rather than rounded. In some embodiments, a shallow relief or notch may be formed in the upper surface of lower core 32 so that the upper core 34 is seated in the relief area or notch to improve mechanical retention and bonding. Fitting the upper core 34 into the notch may also reduce slippage or longitudinal shear forces at the bond, and may enhance the flex profile of the ski. A pocket 60 is formed in upper core 34 for receiving a binding reinforcement plate (not illustrated).

FIGS. 6 and 7 illustrate yet another embodiment like the core 30 of FIGS. 4 and 5, but with a shorter upper core 34 which tapers less than the upper core of FIGS. 4 and 5, and may be seated in a deeper relief area or notch in the upper surface of the lower core 32 to achieve better mechanical connection between the upper and lower cores 34, 32.

FIGS. 8-10 illustrate still another embodiment of a horizontally laminated core construction, wherein the lower core 32a is formed of a vertical laminate of strips of wood and anisotropic foam laminated together in side-by-side relation, as best illustrated in FIG. 10. With reference to FIG. 10, a central strip 72 of relatively soft wood species or bamboo is flanked by strips of anisotropic foam 74. Stringers of harder, denser wood 76 are laminated to the outer sides of the foam strips 74, and additional stringers of soft wood 78 are laminated to the outer sides of the hard wood stringers 76. Alternative constructions involving different vertically laminated combinations of lightweight foam, wood, and other materials are also envisioned for the lower core 32. Through the use of foam, the vertical laminate construction of the lower core 32 of FIGS. 8-10 is lighter weight than a solid wood core, which may be desirable for an alpine touring ski. The vertical laminate construction of lower core 32 of FIGS. 8-10 remains responsive due to the combination of woods of different moduli at the outer margins of the lower core 32. Upper core 34 overlies a portion of lower core 32 and may be formed of a solid horizontal panel of the same soft wood as the central strip of the lower core 32, or of a denser species, or another vertical laminate, but desirably has a flexural modulus that is overall higher than the lower core 32.

The cores of any of FIGS. 4-10 may be substituted for the core of the ski of FIGS. 1-3. In other words, the same overall sandwich construction with carbon fiber composite layers 36, 38, base 22, sidewalls 42, binding reinforcement plate 40, and topsheet 50 may be used with any of the cores 30 of FIGS. 4-10.

Turning now to FIG. 11, which is an enlarged lateral cross section of the ski of FIGS. 1-3 taken along line 11-11 of FIG. 3, the sandwich construction and various layers are illustrated in greater detail. Notably, the upper core 34 is inset in a routed recess in the lower core 32 and narrower than the lower core 32 at section line 11-11, due to the side taper of upper core 34 toward its ends, as best illustrated in FIG. 3. FIG. 11 illustrates how the lower and upper laminate layers 36, 38 respectively underlie and overlie the core 30.

FIG. 12 is an enlarged lateral cross section view taken along line 12-12 of FIG. 3 at the underfoot or binding location, illustrating details of the binding reinforcement plate 40 and the reinforcing carbon fiber upper laminate 38 and topsheet 50 where they overlie the multi-layer core 30 and binding reinforcement plate 40.

The invention claimed is:

1. A gliding board for snow sports, comprising:
a snow-contacting base having a length and width;
a core including a first layer of wooden material, the first layer having a length that overlies substantially the entire length of the base, and a second layer of wooden material overlying at least a portion of the length of the first layer and bonded to a top surface of the first layer that faces away from the base, the second layer having a flexural modulus that is greater than a flexural modulus of the first layer, the first layer including a first species of wood having a first hardness and a first density, and the second layer including a second species of wood that is different from the first species, the second species having a second hardness that is different from the first hardness and/or a second density that is different from the first density; and
a non-wooden laminate layer overlying the core and bonded thereto, the laminate layer comprising a carbon fiber composite material that includes:
a fabric including greater than 50% by weight carbon fibers, and fiberglass, and
a resin impregnating the fabric.

2. The gliding board of claim 1, wherein the laminate layer comprises a strip or panel of metal.

3. The gliding board of claim 1, wherein the fabric further includes aramid fibers and/or PBO fibers.

4. The gliding board of claim 1, wherein the first layer includes a solid plank of wood.

5. The gliding board of claim 4, wherein the second layer includes a solid plank of wood.

6. The gliding board of claim 5, wherein the second species of wood comprising the second layer is harder and/or denser than the first species.

7. The gliding board of claim 1, wherein the first layer is a vertical laminate of strips of material bonded in side-by-side relation, and wherein the strips include at least two wood stringers.

8. The gliding board of claim 7, wherein the vertical laminate includes at least one foam strip.

9. The gliding board of claim 1, wherein at least one of the first and second layers comprises a stack of horizontally-laminated layers of material having an overall flexural modulus, and wherein the overall flexural modulus of the second layer is greater than the overall flexural modulus of the first layer.

10. The gliding board of claim 1, wherein the second layer overlies 50-80% of the length of the first layer and does not overlie a tip region or a tail region of the first layer.

11. The gliding board of claim 1, wherein the second layer is bonded to the first layer by a layer of adhesive, wood glue, or resin.

12. The gliding board of claim 1, wherein the core is profiled to have a continuously smooth top surface.

13. The gliding board of claim 1, wherein the second layer has a sidecut that tapers towards forward and rearward ends of the second layer, so that the forward and the rearward ends are narrower than the first layer at the same location on the gliding board.

14. The gliding board of claim 7, wherein the laminate layer includes strip of metal.

15. The gliding board of claim 7, wherein the second layer overlies 50-80% of the length of the first layer and does not overlie a tip region or a tail region of the first layer.

16. The gliding board of claim 7, wherein the second layer has a sidecut that tapers towards forward and rearward ends of the second layer, so that the forward and the rearward ends are narrower than the first layer at the same location on the gliding board.

17. The gliding board of claim 7, wherein the first layer includes a softer and/or less dense species of wood than the second layer.

18. The gliding board of claim 7, wherein the second layer is a second vertical laminate of strips of material bonded in side-by-side relation.

19. A gliding board for snow sports, comprising:
a snow-contacting base having a length and width;
a core including a first layer of wooden material, the first layer having a length that overlies substantially the entire length of the base, and a second layer of wooden material overlying at least a portion of the length of the first layer and bonded to a top surface of the first layer that faces away from the base, wherein the second layer has a sidecut that tapers towards forward and rearward ends of the second layer, so that the forward and the rearward ends are narrower than the first layer at the same location on the gliding board, wherein the second layer overlies 50-80% of the length of the first layer and does not overlie a tip region or a tail region of the first layer; and
a non-wooden laminate layer overlying the core and bonded thereto, the laminate layer comprising a carbon fiber composite material that includes:
a fabric including greater than 50% by weight carbon fibers, and fiberglass, and
a resin impregnating the fabric.

20. The gliding board of claim 19, wherein the first layer includes a softer and/or less dense species of wood than the second layer.

21. The gliding board of claim 19, wherein the laminate layer includes a strip of metal.

22. The gliding board of claim 19, wherein the first layer is a vertical laminate of strips of material bonded in side-by-side relation, wherein the strips include at least two wood stringers.

23. The gliding board of claim 22, wherein the second layer is a second vertical laminate of strips of material bonded in side-by-side relation.

24. The gliding board of claim 19, wherein the second layer is bonded to the first layer by a layer of adhesive, wood glue, or resin.

25. A gliding board for snow sports, comprising:
a snow-contacting base having a length and width;
a core including:
a first layer of wooden material, the first layer having a length that overlies substantially the entire length of the base, and the first layer having a notch formed in a top surface of the first layer that faces away from the base, and
a second layer of wooden material at least partially seated in the notch and bonded to the first layer, wherein the second layer overlies 50-80% of the length of the first layer and does not overlie a tip region or a tail region of the first layer; and
a non-wooden laminate layer overlying the core and bonded thereto, the laminate layer comprising a carbon fiber composite material that includes:

a fabric including greater than 50% by weight carbon fibers, and fiberglass; and a resin impregnating the fabric.

26. The gliding board of claim 25, wherein the notch has a notch length in a longitudinal direction of the length of the first layer, and second layer has a length in the longitudinal direction corresponding to the notch length.

27. The gliding board of claim 25, wherein the laminate layer includes a strip of metal.

28. The gliding board of claim 25, wherein the first layer is a vertical laminate of strips of material bonded in side-by-side relation, and wherein the strips include at least two wood stringers.

29. The gliding board of claim 28, wherein the vertical laminate includes at least one foam strip bonded to at least one of the wood stringers.

30. The gliding board of claim 27, wherein the second layer is a second vertical laminate of strips of material bonded in side-by-side relation.

31. The gliding board of claim 25, wherein the second layer has a sidecut that tapers towards forward and rearward ends of the second layer, so that the forward and the rearward ends are narrower than the first layer at the same location on the gliding board.

32. The gliding board of claim 25, wherein the first layer is made of a softer and/or less dense species of wood than the second layer.

* * * * *